(12) United States Patent
Sasaki

(10) Patent No.: US 7,357,344 B2
(45) Date of Patent: Apr. 15, 2008

(54) INFORMATION MEDIUM

(75) Inventor: Morimasa Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/626,721

(22) Filed: Jan. 24, 2007

(65) Prior Publication Data
US 2007/0241222 A1 Oct. 18, 2007

(30) Foreign Application Priority Data
Mar. 29, 2006 (JP) .............................. 2006-089702

(51) Int. Cl.
G11B 23/04 (2006.01)
(52) U.S. Cl. .................................. 242/338.2
(58) Field of Classification Search ............ 242/338.2, 242/347.1; 360/132
See application file for complete search history.

(56) References Cited

U.S. PATENT DOCUMENTS

| | | | | |
|---|---|---|---|---|
| 4,418,373 A | * | 11/1983 | Fujimori et al. | 242/347.1 |
| 4,556,153 A | * | 12/1985 | Takagi et al. | 242/347.1 |
| 4,633,355 A | * | 12/1986 | Harada | 242/338.2 |
| 4,646,191 A | * | 2/1987 | Goto | 242/347.1 |
| 4,698,713 A | * | 10/1987 | Kawada | 242/347.1 |
| 5,395,064 A | * | 3/1995 | Honsho et al. | 242/347.1 |
| 5,796,563 A | * | 8/1998 | Iwano et al. | 360/132 |
| 6,345,778 B1 | * | 2/2002 | Ota | 242/347.1 |
| 2005/0006515 A1 | | 1/2005 | Sasaki et al. | |
| 2005/0205708 A1 | | 9/2005 | Sasaki et al. | |
| 2005/0263638 A1 | | 12/2005 | Sasaki et al. | |
| 2005/0274839 A1 | | 12/2005 | Sasaki et al. | |
| 2006/0169817 A1 | | 8/2006 | Sasaki et al. | |
| 2006/0175451 A1 | | 8/2006 | Sasaki et al. | |
| 2006/0214042 A1 | | 9/2006 | Suzuki et al. | |

FOREIGN PATENT DOCUMENTS

| | | |
|---|---|---|
| JP | 7-320448 | 12/1995 |
| JP | 2002-367327 | 12/2002 |

OTHER PUBLICATIONS

U.S. Appl. No. 11/626,642 to Sasaki, which was filed on Feb. 24, 2007.
English language Abstract of JP 2002-367327.
English language Abstract of JP 7-3201448.

\* cited by examiner

Primary Examiner—William A Rivera
(74) Attorney, Agent, or Firm—Greenblum & Bernstein, P.L.C.

(57) ABSTRACT

An information medium includes: a tape reel around which a magnetic tape is wound; a case body that encloses the tape reel; a lid, including a support plate that is pivotally attached to the case body, that opens and closes a withdrawal opening; and a coil spring disposed between the case body and the lid in a state where a first arm portion of the coil spring engages a top plate of the case body and a second arm portion of the coil spring has engaged the lid, the coil spring energizing the lid in a direction of pivotal movement so as to close the withdrawal opening. The coil spring is formed so that the first arm portion is linear, and when the coil spring has been disposed, an end of the first arm portion protrudes from a withdrawal opening-side edge of the top plate.

3 Claims, 6 Drawing Sheets

INFORMATION MEDIUM

BACKGROUND OF THE INVENTION

1. Field of the Invention

The present invention relates to an information medium equipped with a case body that rotatably houses a tape reel, a lid that opens and closes a withdrawal opening of the case body, and a coil spring that energizes the lid.

2. Description of the Related Art

As one example of this type of information medium, a tape cassette disclosed by Japanese Laid-Open Patent Publication No. 2002-367327 is known. This tape cassette is constructed by rotatably disposing hubs around which a magnetic tape has been wound inside a cassette case including an upper shell and a lower shell. A lid that protects the magnetic tape is pivotally supported on a front surface of the cassette case. A torsion coil spring that energizes the lid towards a closed position is disposed between the lid and the upper shell and when the tape cassette is not in use (i.e., when the tape cassette has been ejected from a recording/reproducing apparatus), the front surface of the cassette case is covered by the lid due to the energizing force of the torsion coil spring.

As another example of this type of information medium, a tape cassette is disclosed by the present applicant in Japanese Laid-Open Patent Publication No. H07-320448. In this tape cassette also, like the tape cassette described above, a lid is pivotally disposed at the front surface of a case body (which corresponds to the "cassette case" of the tape cassette described above), and the lid is energized by a lid spring (which corresponds to the "torsion coil spring" of the tape cassette described above). Since a linear foot portion of the lid spring (i.e., one of the "hooking arms" for the tape cassette described above) is cut during the manufacturing process of the lid spring, burrs are sometimes produced on the end surface of the foot portion. When using this type of lid spring, there is the risk of the burrs catching on the upper case that is engaged by the end of the foot portion (the "upper shell" for the tape cassette described above), resulting in defective operation of the lid. For this reason, in the tape cassette described above, to avoid contact between the end surface of the foot portion and the upper case, the end of the foot portion of the lid spring (referred to as the "end portion (25)" in the former publication and the "end" in the latter publication) is bent back.

SUMMARY OF THE INVENTION

However, by investigating the tape cassettes described above, the present inventor found the following issue to be addressed. In such tape cassettes, contact between the end surface of the foot portion and the upper case is avoided by bending back the end of the foot portion of the lid spring. This means that the number of processes carried out when manufacturing the lid spring is increased by the processes required to bend back the end of the foot portion. This kind of bending process is susceptible to producing slight differences in dimensions due to small differences in the machining conditions. The dimensions of such lid springs have very small tolerances, and therefore a high level of machining skill is required to produce lid springs with dimensions that fall within the predetermined tolerances. Accordingly, with the tape cassettes described above, it is difficult to reduce the manufacturing cost due to the increase in processing steps and the high level of machining skill required when manufacturing the lid spring.

The present invention was conceived to resolve the issue described above and it is a principal object of the present invention to provide an information medium that has a reduced manufacturing cost and whose lid can be smoothly opened and closed.

To achieve the stated object, an information medium according to the present invention includes: a tape reel around which a magnetic tape is wound; a case body that rotatably encloses the tape reel; a lid, including a support plate that is pivotally attached to the case body, that opens and closes a withdrawal opening for pulling out the magnetic tape; and a coil spring disposed between the case body and the lid in a state where a first arm portion of the coil spring engages a top plate of the case body and a second arm portion of the coil spring has engaged the lid, the coil spring energizing the lid in a direction of pivotal movement so as to close the withdrawal opening, wherein the coil spring is formed so that the first arm portion is linear, and when the coil spring has been disposed, an end of the first arm portion protrudes from a withdrawal opening-side edge of the top plate.

According to this information medium, by constructing the coil spring so that the first arm portion is linearly formed and so that the end of the first arm portion protrudes from a withdrawal opening-side edge of the top plate when the coil spring has been disposed, it is possible to reliably avoid contact between the top plate or the like and an end surface of the arm portion without having to bend back the end of the arm portion. This means that even if burrs are produced on the end surface of the arm portion, a situation where the burrs catch on the top plate or the like, which would result in defective operation of the lid, can be reliably avoided. Since it is possible to make a bending process that requires a high level of machining skill unnecessary, it is possible to sufficiently reduce the manufacturing cost of the coil spring by a corresponding amount. Therefore, according to this information medium, it is possible to smoothly open and close the lid and to sufficiently reduce the manufacturing cost. In a construction where the end of the arm portion is bent as in a conventional information medium, since the length of the bent portion (or the length of the linear portion) differs for each coil spring, the contact length (the contact area) for the contact between the top plate or side wall and the arm portion differs for each coil spring, resulting in slight differences in the sliding resistance for such parts between individual coil springs. This means that with a conventional information medium, differences (i.e., fluctuations) are produced in the force required to open and close the lid. On the other hand, with the information medium according to the present invention, by constructing the coil spring so that the end of the arm portion protrudes from the edge of the top plate, it is possible to make the contact length between the top plate or side wall and the arm portion constant (or substantially constant). Therefore, according to this information medium, it is possible to keep the force required to open and close the lid constant.

A protruding portion may be formed on the top plate and the first arm portion may be positioned at a corner portion between the protruding portion and the top plate. Here, although a large part of the arm portion would contact a side wall or the like of the case body with a construction where the protruding portion was not formed, for example, by constructing the information medium as described above and positioning the arm portion at a corner portion between the protruding portion and the top plate, it is possible to maintain a state where only a small part of the arm portion contacts the protruding portion. Accordingly, since it is possible to reduce the sliding resistance of the arm portion when the lid is opened and closed (that is, the sliding resistance between the arm portion and the protruding portion), it becomes possible to open and close the lid much more smoothly. Also, with a construction that is not equipped with a protruding portion, movement of the arm portion toward the side wall is not restricted, and therefore the contact length (i.e., the contact area) between the side wall and the arm portion varies. With the above construction however, by positioning the arm portion at the corner portion between the protruding portion and the top plate, it is possible to reliably restrict movement of the arm portion toward the side wall, which means that the side wall and the arm portion can always be kept apart. By doing so, it is possible to suppress variation in the sliding resistance between the side wall and the arm portion due to variation in the contact length between such parts.

Also, a pair of the protruding portions may be formed on the top plate and the first arm portion may be positioned in a gap between the pair of protruding portions. With this construction, by positioning (inserting) the arm portion in the gap between the protruding portions, it is possible to reliably restrict movement of the arm portion not only toward the side wall but also away from the side wall. Since it is possible to reliably prevent rattling of the coil spring due to movement of the arm portion toward or away from the side wall, the energizing force of the coil spring applied to the lid can be kept constant. Therefore, according to this information medium, it is possible to make the force required to open and close the lid even more constant.

It is also possible to form an inclined surface, which is inclined toward the first arm portion positioned at the corner portion, on the protruding portion. With this construction, during assembly of the information medium, by merely fitting the lid that has been combined with the coil spring onto the case body, it is possible to move the arm portion smoothly and guide the arm portion to the corner portion of the top plate and the protruding portion (i.e., into the gap between the protruding portions). This means that it is possible to quickly and easily attach the coil spring.

Also, the second arm portion of the coil spring may engage the support plate of the lid, the lid may be attached to the case body so that the support plate is positioned further outside the case body than a side wall that forms a running path for the magnetic tape in the case body, the pair of protruding portions may be disposed in parallel between the support plate and the side wall, and the inclined surface may be formed on the protruding portion positioned closer to the side wall. With this construction, when attaching the coil spring in a state where the second arm portion has engaged the support plate of the lid, it becomes possible for the arm portion positioned on the side wall (i.e., on the inside of the case body) to move more smoothly across the inclined surface.

It should be noted that the disclosure of the present invention relates to a content of Japanese Patent Application No. 2006-89702 that was filed on 29 Mar. 2006 and the entire content of which is herein expressly incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information medium according to the present invention will now be described with reference to the attached drawings.

First, the construction of an information medium 1 will now be described with reference to the drawings.

Figure 1:
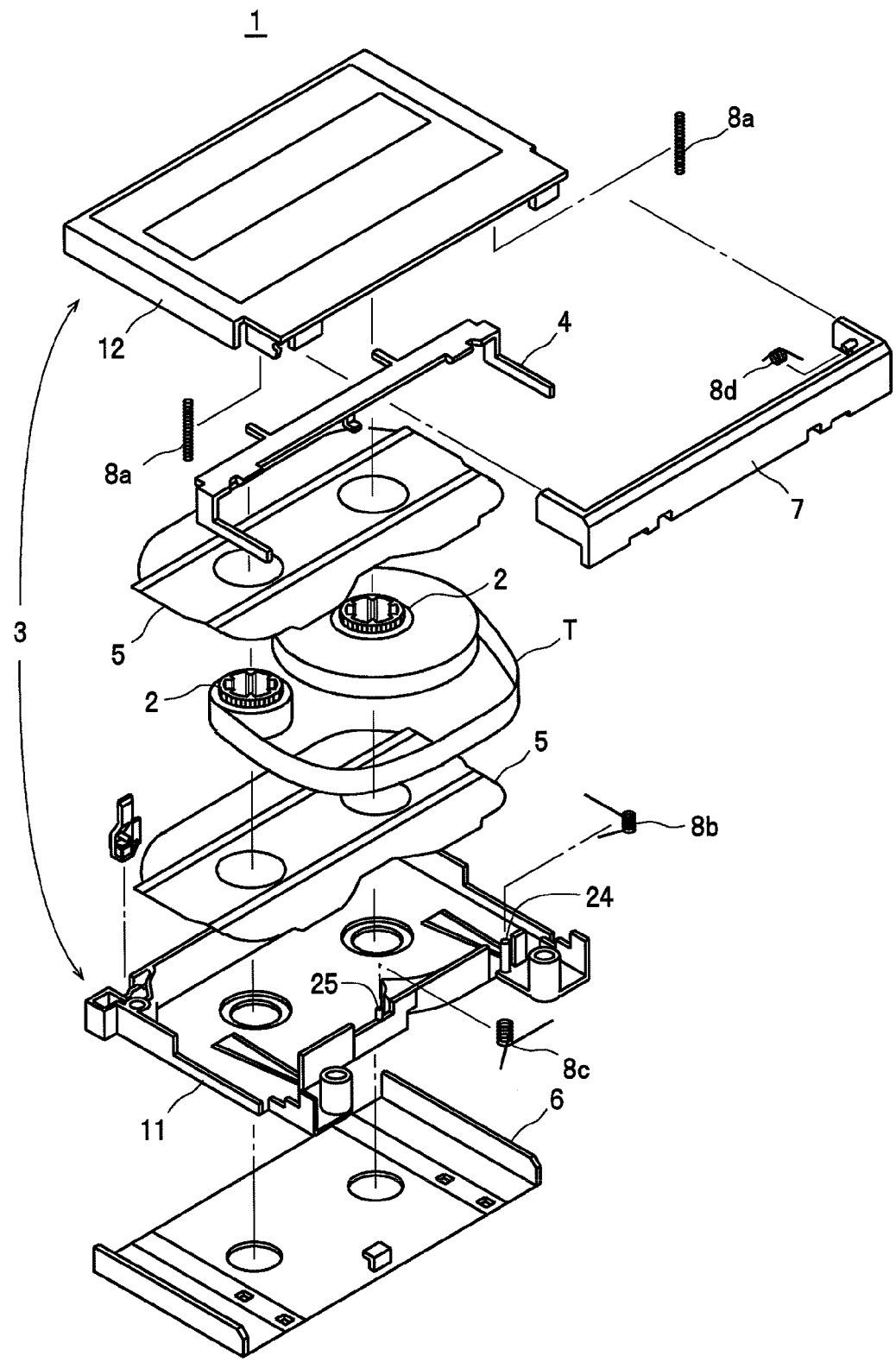
FIG. 1 is an exploded perspective view of an information medium.
Figure 2:
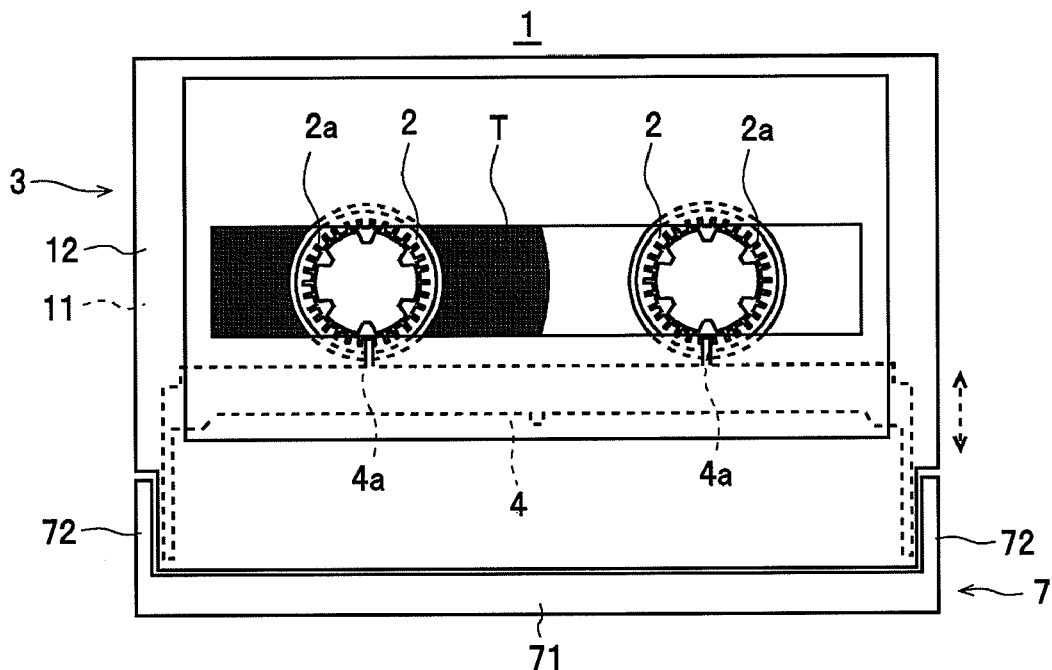
FIG. 2 is a plan view of the information medium.
Figure 3:
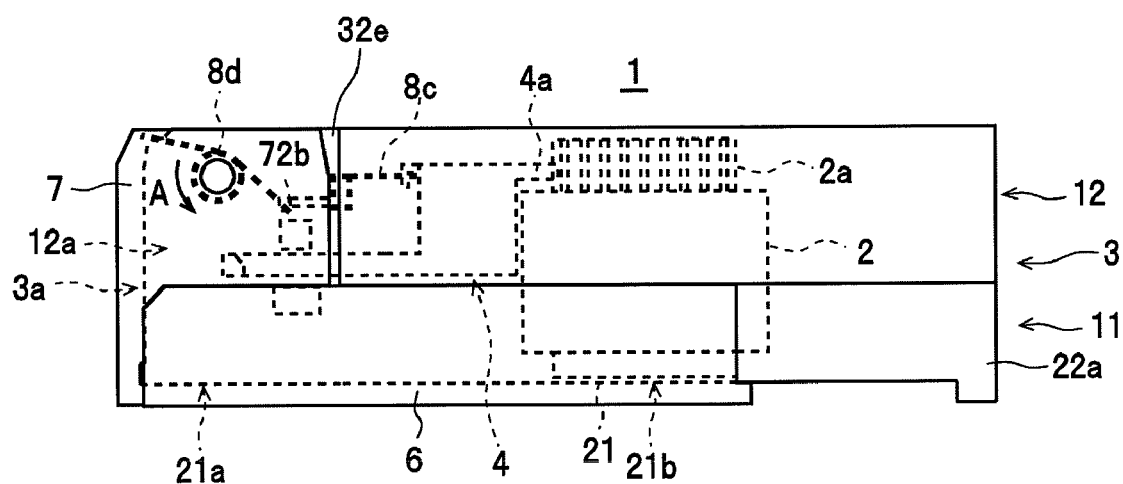
FIG. 3 is a side view of the information medium.

The information medium 1 shown in FIGS. 1 to 3 is a two-reel cartridge-type information medium used as a storage device for backing up data recorded by an electronic computer, for example, and is constructed of two tape reels 2 around which magnetic tape T is wound, a case body 3, a reel brake 4, two sheets 5, a slide portion 6, and a lid 7.

As shown in FIGS. 1 and 2, the tape reels 2 are constructed so that the magnetic tape T can be wound therearound and as shown in FIGS. 2 and 3, are housed inside the case body 3. Here, teeth 2a, which engage protruding portions 4a of the reel brake 4 and thereby prevent rotation of the tape reels 2, are formed at one end of the tape reels 2 (the upper end in FIG. 1).

Figure 4:
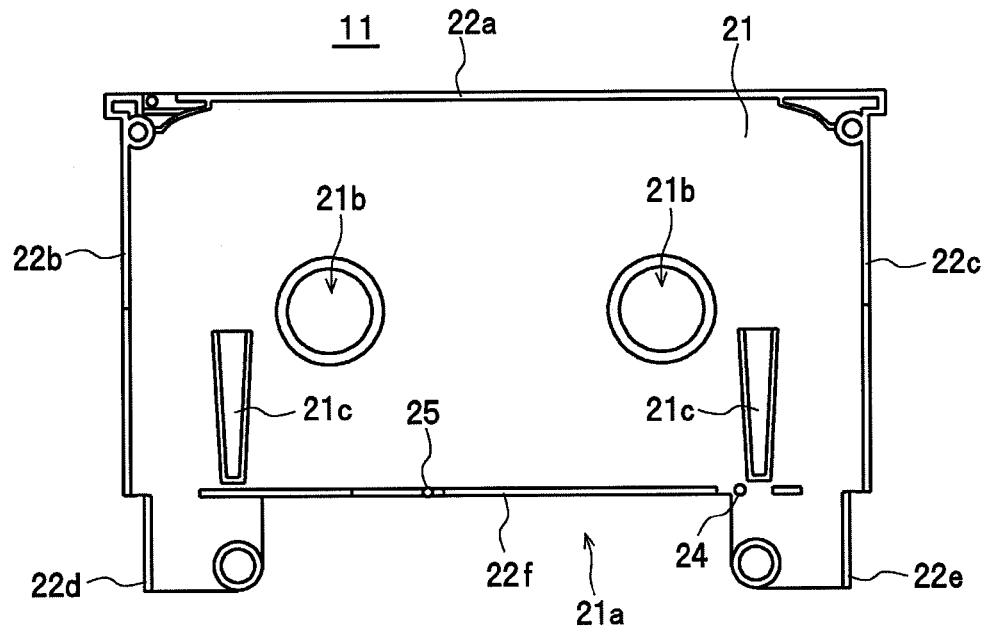
FIG. 4 is a plan view of a lower case when looking from an inner surface side thereof.

As shown in FIGS. 1 and 3, the case body 3 includes a lower case 11 and an upper case 12 that can be fitted together and rotatably encloses the tape reels 2 in an internal space formed when the lower and upper cases 11 and 12 are fitted together. As shown in FIG. 4, the lower case 11 includes a base plate 21 and side walls 22a to 22f and is formed in the overall shape of a shallow plate. A cutaway portion 21a is formed in the center of a side of the base plate 21 that becomes the front surface (the bottom side in FIG. 4) when the information medium 1 is inserted into a drive apparatus. The cutaway portion 21a and an opening 12a of the upper case 12 described later together form a withdrawal opening 3a (see FIG. 11) for withdrawing the magnetic tape T. Circular through-holes 21b for allowing drive shafts of the drive apparatus to be inserted through the base plate 21 are formed in the base plate 21. Arm-shaped locking portions 21c for locking the slide portion 6 in a non-slidable state are also formed on the cutaway portion 21a side of the base plate 21. Front ends of the locking portions 21c are pressed toward the slide portion 6 by locking springs 8a shown in FIG. 1. In addition, a protruding part 24 for fixing a slide spring 8b (see FIG. 1) is formed near the side wall 22f of the base plate 21.

As shown in FIG. 4, the side wall 22a is erected at the rear edge of the base plate 21 (the top side in FIG. 4). The side walls 22b, 22c are erected at edges on both sides of the base plate 21. The side wall 22f is erected at the front edge of the base plate 21 (the bottom side in FIG. 4). A protruding part 25 for fixing a brake spring 8c (see FIG. 1) is formed in the side wall 22f. Together with side walls 32a to 32c of the upper case 12, described later, the side walls 22a to 22c and 22f form an enclosure for enclosing the tape reels 2. The side walls 22d and 22e are parallel (or substantially parallel) to the side walls 22b and 22c and are erected at edges at the front parts of both sides of the base plate 21 so as to be respectively positioned further inside the base plate 21 than the side walls 22b and 22c. Together with side walls 32d and 32e of the upper case 12, described later, the side walls 22d and 22e form a running path for the magnetic tape T.

Figure 5:
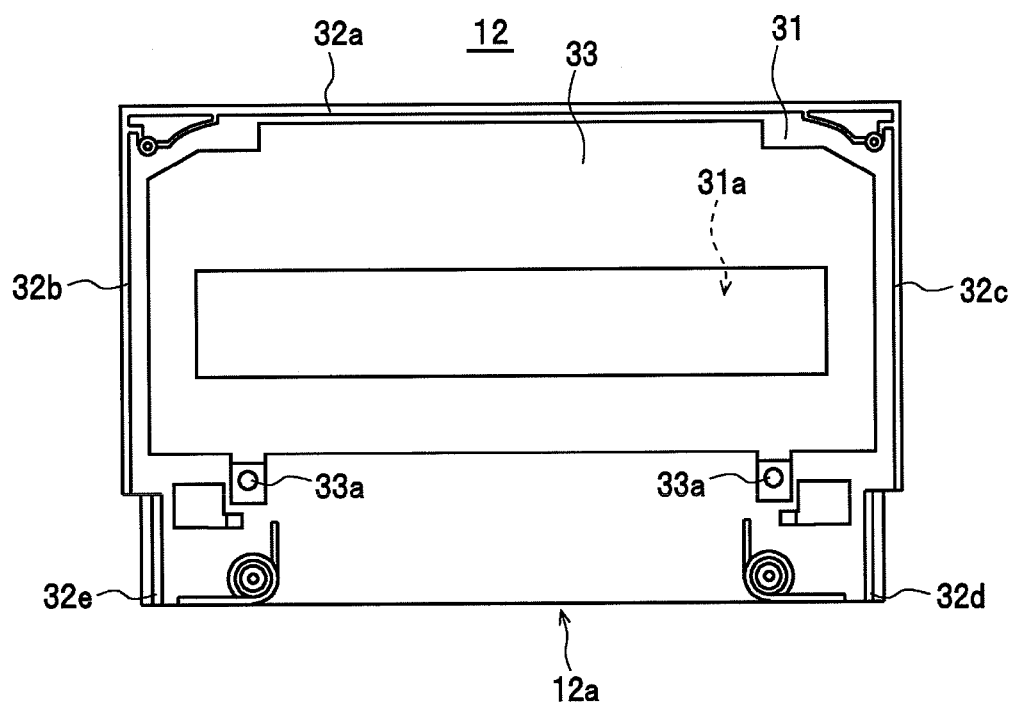
FIG. 5 is a plan view of an upper case when looking from an inner surface side thereof.

As shown in FIG. 5, the upper case 12 includes a top plate 31 and side walls 32a to 32e and is formed in the overall shape of a shallow plate with an opening 12a in a side (the bottom side in FIG. 5) that becomes the front surface when the information medium 1 is inserted into a drive apparatus. The top plate 31 is formed in an overall rectangular shape. A rectangular window 31a is formed in the center of the top plate 31 and a transparent (or substantially transparent) cover 33 is attached to the window 31a. Protruding portions 33a for fixing the locking springs 8a (see FIG. 1) are also formed on the cover 33.

Figure 6:
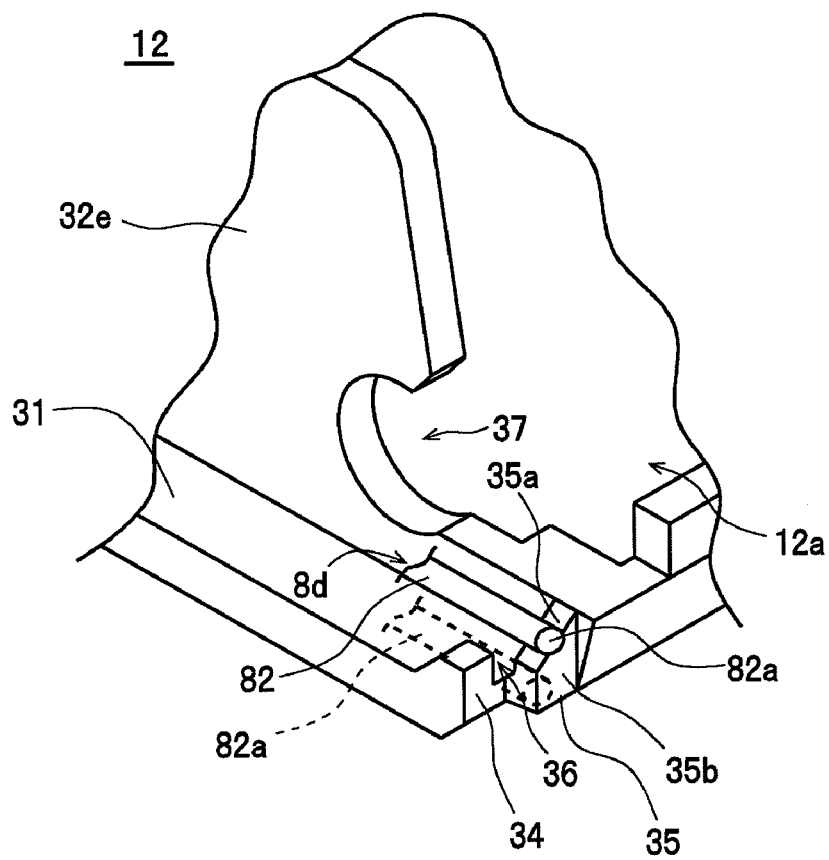
FIG. 6 is a perspective view showing the construction of the periphery of ribs of the upper case.

As shown in FIG. 5, the side wall 32a is erected at the rear edge (the top side in FIG. 5) of the top plate 31. The side walls 32b and 32c are erected at edges on both sides of the top plate 31. Together with the side walls 22a to 22c and 22f of the lower case 11, the side walls 32a to 32c form an enclosure for enclosing the tape reels 2. The side walls 32d and 32e are parallel (or substantially parallel) to the side walls 32b and 32c and are erected at edges at the front parts (shown at the bottom in FIG. 5) of both sides of the top plate 31 so as to be respectively positioned further inside the top plate 31 than the side walls 32b and 32c. Together with the side walls 22d and 22e of the lower case 11, the side walls 32d and 32e form a running path for the magnetic tape T. Also, as shown in FIG. 6, semicircular cutaway parts 37 into which rotation shafts 72a formed on support plates 72 of the lid 7, described later, are fitted are formed in the side walls 32d and 32e in the periphery of the opening 12a (only the side wall 32e is shown in FIG. 6).

Figure 10:
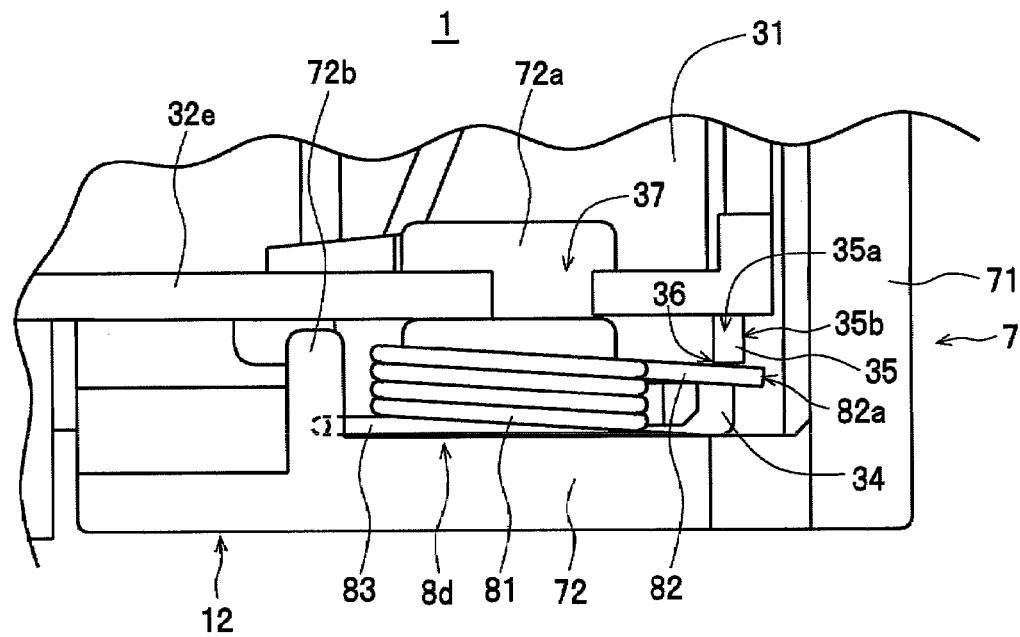
FIG. 10 is a plan view of a state where the lid has been attached to the upper case.

Also, as shown in FIG. 10, ribs 34 and 35 are formed (in parallel) at one end of the opening 12a-side edge of the top plate 31 (the left end in FIG. 5), or in other words, between the side wall 32e of the top plate 31 and one of the support plates 72 of the lid 7. The ribs 34 and 35 correspond to a "pair of protruding portions" for the present invention and when one arm portion 82 (see FIG. 8) of a lid spring 8d is positioned in (i.e., fitted into) a gap 36 between the ribs 34 and 35 (i.e., at a corner portion between at least one of the ribs 34 and 35 and the top plate 31), the ribs 34 and 35 function so as to prevent vibration of the arm portion 82 in the horizontal direction (the up-down direction in FIG. 10). Also, as shown in FIG. 6, out of the ribs 34 and 35, the rib 35 positioned closer to the side wall 32e is provided with an inclined surface 35a that is inclined toward the arm portion 82 positioned in the gap 36, i.e., toward the center of the gap 36. More specifically, the inclined surface 35a is formed on the surface at the protruding end of the rib 35 (i.e., the upper surface in FIG. 6). Note that although the inclined surface 35a is formed across the entire surface of the protruding end of the rib 35 in FIG. 6, the inclined surface 35a may be formed across only part of such surface. The inclined surface 35a functions as a guide that guides the arm portion 82 into the gap 36 during attachment of the lid spring 8d.

As shown in FIGS. 2 and 3, the reel brake 4 is disposed inside the case body 3 so as to be able to slide toward and away from the tape reels 2. The reel brake 4 is caused to slide when the lid 7 is pivotally moved so that the reel brake 4 either locks the tape reels 2 to prevent rotation or releases such locking. As shown in FIG. 1, the sheets 5 are respectively disposed between the lower case 11 and the tape reels 2 and between the tape reels 2 and the upper case 12, enable the tape reels 2 to rotate smoothly, and restrict movement of the magnetic tape T in the width direction. As shown in FIG. 3, the slide portion 6 is slidably attached to the outside of the lower case 11.

Figure 7:
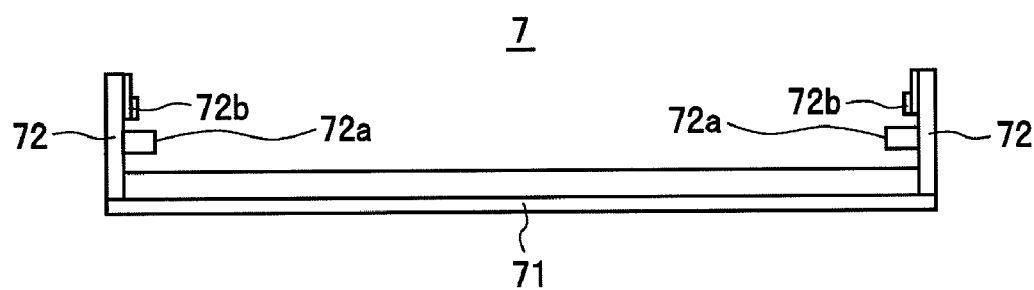
FIG. 7 is a plan view of a lid when looking from a rear surface side thereof.
Figure 11:
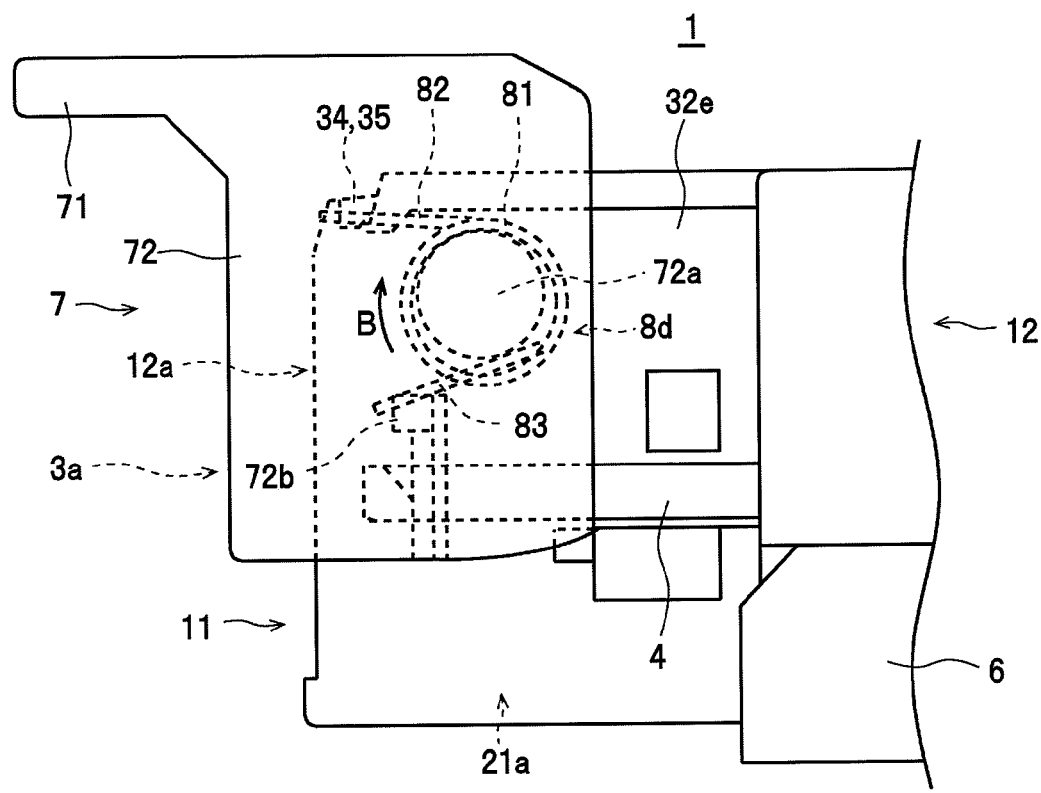
FIG. 11 is a side view of the information medium in a state where an opening has been opened.

As shown in FIG. 7, the lid 7 includes a main part 71 and the support plates 72 formed at both ends of the main part 71. The rotation shafts 72a and protruding portions 72b are formed on the support plates 72. As shown in FIGS. 10 and 11, the lid 7 is pivotally supported by the side walls 32d and 32e of the upper case 12 by having the rotation shafts 72a of the support plates 72 fitted into the cutaway parts 37 formed in the side walls 32d and 32e (only the side wall 32e is shown in these drawings). The lid 7 is energized in the direction of the arrow A shown in FIG. 3 (a direction whereby the lid 7 closes the opening 12a) by the lid spring 8d shown in FIGS. 1, 8, and 9. The lid 7 is pivotally moved by the drive apparatus so that the opening 12a is opened and closed by the main part 71.

Figure 8:
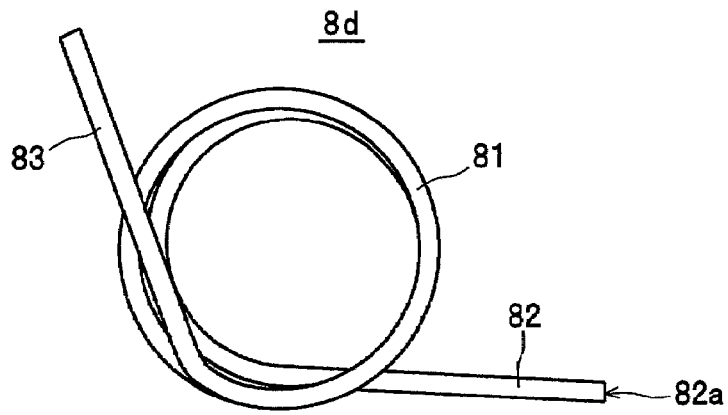
FIG. 8 is a front view of a lid spring.
Figure 9:
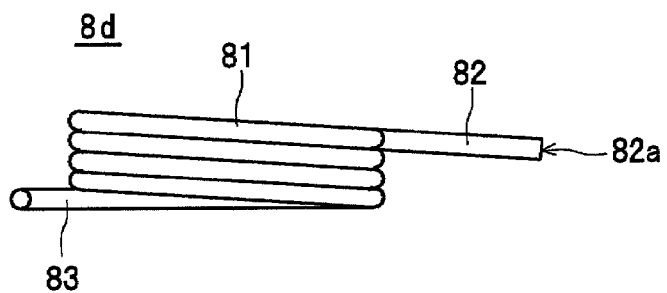
FIG. 9 is a plan view of the lid spring.

The lid spring 8d corresponds to a "coil spring" for the present invention and as shown in FIGS. 8 and 9 includes a coil portion 81 and arm portions 82 and 83. As shown in FIG. 10, the lid spring 8d is disposed between the upper case 12 of the case body 3 and the support plate 72 of the lid 7. As shown in FIG. 10, the lid spring 8d is disposed so that a rotation shaft 72a of the lid 7 is inserted through the coil portion 81 of the lid spring 8d, the arm portion 82 (a "first arm portion" for the present invention) engages the top plate 31 of the upper case 12, the arm portion 83 (a "second arm portion" for the present invention) engages a protruding portion 72b of the support plate 72, and energizes the lid 7.

The lid spring 8d differs to the lid spring of a conventional tape cassette where the ends of the arm portions are bent back in that the ends of the arm portion 82 are linearly formed as shown in FIGS. 8 and 9. This means that the lid spring 8d can be manufactured at a lower cost that is reduced by an amount corresponding to the bending process that is no longer required. With the lid spring 8d, the length from the virtual center of the coil portion 81 to the end surface 82a of the arm portion 82 is set longer than the distance from the virtual center of the cutaway parts 37 of the side wall 32e of the upper case 12 to the front surface 35b (see FIG. 6) of the rib 35. This means that as shown in FIG. 10, when the lid spring 8d has been disposed, the end (the end surface 82a) of the arm portion 82 protrudes from a withdrawal opening 3a-side edge of the top plate 31 (i.e., from the front surface 35b of the rib 35) toward the withdrawal opening 3a.

Next, one example method of assembling the information medium 1 will be described with reference to the drawings.

The lower part of the information medium 1 is assembled first. More specifically, as shown in FIG. 1, the slide spring 8b is fitted onto the protruding part 24 of the lower case 11 of the case body 3. Next, one end of the slide spring 8b is caused to engage the slide portion 6 and the slide portion 6 is attached to the outside of the lower case 11. After this, as shown in FIG. 1, one sheet 5 is placed on an inner surface side of the base plate 21 of the lower case 11 and the tape reels 2, around which the magnetic tape T has been wound in advance, are placed on the sheet 5. Next, the other sheet 5 is placed on the tape reels 2. After this, the brake spring 8c is fitted onto the protruding part 25 of the lower case 11.

Next, one end of the brake spring 8c is caused to engage the reel brake 4 and the reel brake 4 is set on the lower case 11.

Next, the upper part of the information medium 1 is assembled. More specifically, as shown in FIG. 1, the locking springs 8a are fitted onto the protruding portions 33a (see FIG. 5) of the cover 33 that has been fixed in advance to the upper case 12. After this, as shown in FIG. 10, the rotation shaft 72a of one of the support plates 72 (the left support plate 72 in FIG. 7) of the lid 7 is passed through the coil portion 81 of the lid spring 8d and the end of the arm portion 83 of the lid spring 8d is caused to engage the protruding portion 72b of the support plate 72, thereby combining the lid spring 8d with the lid 7.

After the lid 7 has been combined with the lid spring 8d, as shown in FIG. 10, the rotation shafts 72a of the support plates 72 of the lid 7 are fitted into the cutaway parts 37 of the side walls 32d and 32e of the upper case 12. When doing so, as shown in FIG. 6, the end of the arm portion 82 of the lid spring 8d smoothly moves toward the top plate 31 along the inclined surface 35a of the rib 35 and is guided into the gap 36 between the rib 34 and the rib 35. By doing so, the lid 7 is attached to the upper case 12 and as shown in FIG. 10, the lid spring 8d is attached (disposed) between the upper case 12 and the lid 7. When doing so, as described above, the end (the end surface 82a) of the arm portion 82 protrudes from the withdrawal opening 3a-side edge of the top plate 31 (i.e., from the front surface 35b of the rib 35) toward the withdrawal opening 3a, so that contact between the top plate 31 or the side wall 32e and the end surface 82a of the arm portion 82 is reliably avoided.

Next, as shown in FIG. 3, the upper case 12 and the lower case 11 are fitted together so that the end surfaces of the side walls 22a to 22e of the lower case 11 respectively face the end surfaces of the side walls 32a to 32e of the upper case 12. After this, the upper case 12 and the lower case 11 are screwed together. By doing so, assembly of the information medium 1 is completed.

Next, a method of recording and reproducing data using the information medium 1 will be described with reference to the drawings.

In a state where the information medium 1 has been ejected from a drive apparatus, not shown, that is, when the information medium 1 is not in use, as shown in FIG. 3, the reel brake 4 is positioned close to the tape reels 2 due to the energizing force of the brake spring 8c. This results in the protruding portions 4a of the reel brake 4 respectively engaging the teeth 2a of the tape reels 2 and thereby preventing rotation of the tape reels 2. As shown in FIG. 3, the lid 7 is energized in the direction of the arrow A by the lid spring 8d and covers the opening 12a in the upper case 12 of the case body 3. The slide portion 6 is positioned on the cutaway portion 21a side of the base plate 21 of the lower case 11 and covers the through-holes 21b and the cutaway portion 21a of the base plate 21.

On the other hand, when the information medium 1 has been inserted from an insertion opening of the drive apparatus toward a loading part, the loading part pulls the information medium 1 into the apparatus. When doing so, the front ends of the locking portions 21c of the lower case 11 are pressed upward, thereby releasing the locking of the slide portion 6 in a non-slidable state. Next, as shown in FIG. 11, the slide portion 6 is caused to slide toward the side wall 22a side of the lower case 11 (see FIG. 3), thereby opening the through-holes 21b and the cutaway portion 21a of the lower case 11. After this, the loading part moves the information medium 1 toward front ends of the drive shafts of the drive apparatus. When doing so, the drive shafts are inserted through the through-holes 21b into the centers of the tape reels 2.

Next, as shown in FIG. 11, the drive apparatus pivotally moves the lid 7 in the direction of the arrow B against the energizing force of the lid spring 8d, thereby opening the opening 12a of the upper case 12. Here, with the information medium 1, the end (the end surface 82a) of the arm portion 82 of the lid spring 8d protrudes from the withdrawal opening 3a-side edge of the top plate 31 toward the withdrawal opening 3a, so that contact between the top plate 31 or the side wall 32e and the end surface 82a is reliably avoided. Accordingly, even if burrs are produced on the end surface 82a of the arm portion 82, a situation where the burrs catch on the top plate 31 or the side wall 32e is avoided, and as a result the lid 7 is pivotally moved smoothly.

On the other hand, as shown in FIG. 11, by pivotally moving the lid 7, the protruding portions 72b of the support plate 72 of the lid 7 engage protruding parts (not shown) at the front end of the reel brake 4 so that the reel brake 4 is moved toward the opening 12a. As the reel brake 4 moves, the engagement between the teeth 2a of the tape reels 2 and the protruding portions 4a of the reel brake 4 is released, thereby releasing the locking of rotation of the tape reels 2. Next, the drive apparatus rotates the tape reels 2 and starts reading and/or writing data.

When the reading or writing of data has ended, the loading part separates the information medium 1 from the front ends of the drive shafts. After this, by causing the lid 7 to pivotally move in the direction of the arrow A shown in FIG. 3, the opening 12a of the upper case 12 is covered as shown in FIG. 3. Here, as described above, since the end of the arm portion 82 of the lid spring 8d protrudes from the withdrawal opening 3a-side edge of the top plate 31 toward the withdrawal opening 3a, even if burrs are produced on the end surface 82a of the arm portion 82, it can be ensured that the lid 7 will pivotally move smoothly.

On the other hand, as shown in FIG. 3, by pivotally moving the lid 7, the engagement between the protruding portions 72b of the support plates 72 of the lid 7 and the protruding parts at the front ends of the reel brake 4 is released, resulting in the reel brake 4 being moved by the energizing force of the brake spring 8c toward the tape reels 2. Due to such movement of the reel brake 4, the teeth 2a of the tape reels 2 and the protruding portions 4a of the reel brake 4 engage and therefore prevent rotation of the tape reels 2. Next, the loading part pushes the information medium 1 out of the insertion opening. At this time, as shown in FIG. 3, the slide portion 6 is caused to slide toward the cutaway portion 21a side of the base plate 21 of the lower case 11 and thereby covers the cutaway portion 21a and the through-holes 21b. By doing so, it becomes possible to remove the information medium 1 from the insertion opening of the drive apparatus.

In this way, according to the information medium 1, by constructing the lid spring 8d so that the arm portion 82 is linearly formed and so that when the lid spring 8d is disposed, the end of the arm portion 82 protrudes from the withdrawal opening 3a-side edge of the top plate 31 toward the withdrawal opening 3a, it is possible to reliably avoid contact between the top plate 31 or side wall 32e and the end surface 82a of the arm portion 82 without having to bend back the end of the arm portion 82. This means that even if burrs are produced on the end surface 82a of the arm portion 82, a situation where the burrs catch on the top plate 31 or the side wall 32e, resulting in defective operation of the lid 7 can be reliably avoided. Also, since it is possible to make the bending process that requires a high level of machining skill unnecessary, it is possible to sufficiently reduce the manufacturing cost of the lid spring 8d by a corresponding amount. Therefore, according to the information medium 1, it is possible to sufficiently reduce the manufacturing cost while making it possible to smoothly open and close the lid 7. In a construction where the end of the arm portion is bent back as in a conventional information medium, since the length of the bent back portion (or the length of the linear portion) differs for each lid spring, the contact length (the contact area) for the contact between the top plate or side wall and the arm portion differs for each lid spring, resulting in slight differences in the sliding resistance for such parts between individual lid springs. This means that with the conventional information medium, differences (i.e., fluctuations) are produced in the force required to open and close the lid. On the other hand, with the information medium 1, by constructing the lid spring 8d so that the end of the arm portion 82 protrudes from the edge of the top plate 31, it is possible to make the contact length between the top plate 31 or the side wall 32e and the arm portion 82 constant (or substantially constant). Therefore, according to the information medium 1, it is possible to keep the force required to open and close the lid 7 constant.

Also, although a large part of the arm portion 82 would contact the side wall 32e with a construction where the ribs 34 and 35 are not formed, for example, by constructing the information medium 1 so that the ribs 34 and 35 are formed on the top plate 31 and positioning the arm portion 82 at (i.e., fitting the arm portion 82 into) a corner portion between at least one of the ribs 34 and 35 and the top plate 31, it is possible to maintain a state where only a small part of the arm portion 82 contacts the ribs 34 and 35. Accordingly, since it is possible to reduce the sliding resistance of the arm portion 82 when the lid 7 is opened and closed (that is, sliding resistance between the arm portion 82 and the ribs 34 and 35), it becomes possible to open and close the lid 7 much more smoothly. Also, with a construction that is not equipped with the ribs 34 and 35, movement of the arm portion 82 toward the side wall 32e is not restricted, and therefore the contact length (i.e., the contact area) between the side wall 32e and the arm portion 82 varies. With the information medium 1 however, by positioning the arm portion 82 at the corner portion between the ribs 34 and 35 and the top plate 31, it is possible to reliably restrict movement of the arm portion 82 toward the side wall 32e, which means that the side wall 32e and the arm portion 82 can always be kept apart. By doing so, it is possible to suppress the variation in the sliding resistance between the side wall 32e and the arm portion 82 due to variation in the contact length between such parts.

Also, according to the information medium 1, by forming the pair of ribs 34 and 35 on the top plate 31 and positioning (inserting) the arm portion 82 in the gap 36 between the ribs 34 and 35, it is possible to reliably restrict movement of the arm portion 82 not only toward the side wall 32e but also away from the side wall 32e. Since it is possible to reliably prevent rattling of the lid spring 8d due to movement of the arm portion 82 toward or away from the side wall 32e, the energizing force of the lid spring 8d applied to the lid 7 can be kept constant. Therefore, according to the information medium 1, it is possible to make the force required to open and close the lid 7 even more constant.

Also, according to the information medium 1, by providing the rib 35 with the inclined surface 35a that is inclined toward the arm portion 82 positioned at the corner portion of one of the ribs 34 and 35 and the top plate 31 (i.e., inclined toward the center of the gap 36), during assembly of the information medium 1, by merely fitting the lid 7 that has been combined with the lid spring 8d onto the upper case 12, it is possible to move the arm portion 82 smoothly and guide the arm portion 82 to the corner portion of one of the ribs 34 and 35 and the top plate 31 (i.e., into the gap 36). This means that it is possible to quickly and easily attach the lid spring 8d.

Also, according to the information medium 1, by disposing the ribs 34 and 35 in parallel between the side wall 32e of the case body 3 and the support plate 72 of the lid 7 positioned further outside the case body 3 than the side wall 32e and forming the inclined surface 35a on the rib 35 positioned closer to the side wall 32e out of the ribs 34 and 35, when attaching the lid spring 8d in a state where the arm portion 83 has already engaged the support plate 72 of the lid 7, it becomes possible for the arm portion 82 positioned on the side wall 32e side (i.e., on the inside of the upper case 12) to move more smoothly across the inclined surface 35a.

Figure 12:
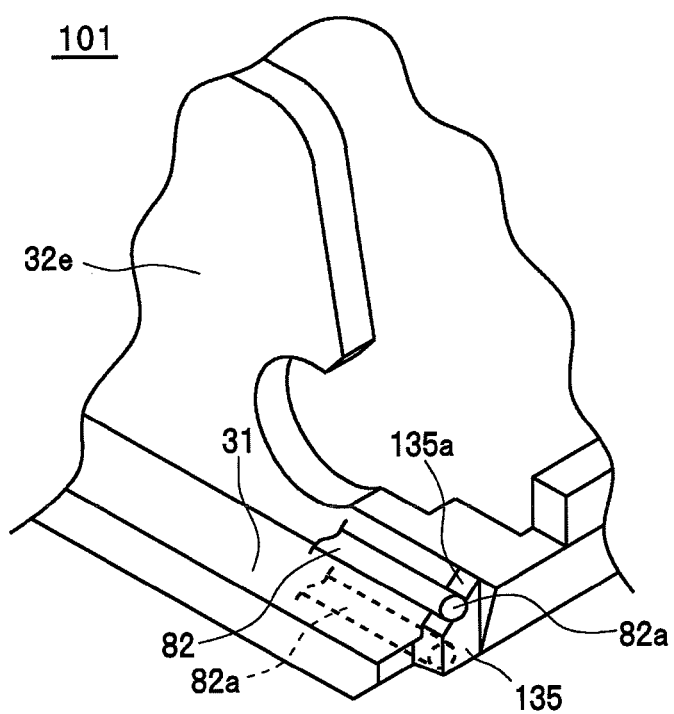
FIG. 12 is a perspective view showing the construction of the periphery of a rib of another information medium.

Note that the present invention is not limited to the construction described above. For example, although an example has been described where a pair of ribs 34, 35 are formed on the top plate 31, like an information medium 101 shown in FIG. 12, it is possible to use a construction equipped with a single rib 135 (a "protruding portion" for the present invention). As shown in FIG. 12, in the same way as the rib 35 described above, an inclined surface 135a that is inclined toward the arm portion 82 positioned at a corner portion between the rib 135 and the top plate 31 is formed on the rib 135. With the information medium 101 also, by forming the rib 135 on the top plate 31 and positioning the arm portion 82 at the corner portion between the rib 135 and the top plate 31, movement of the arm portion 82 toward the side wall 32e is reliably prevented, so that the side wall 32e and the arm portion 82 can always be kept apart. This means that it is possible to suppress variations in the sliding resistance between the side wall 32e and the arm portion 82 due to variations in the contact length of the side wall 32e and the arm portion 82. By forming the inclined surface 135a of the rib 135, in the same way as in the information medium 1, it is possible to quickly and easily attach the lid spring 8d.

It is also possible to use a construction where the lid spring 8d is disposed in a state where the arm portion 83 engages the top plate 31 of the upper case 12 and the arm portion 82 engages the support plate 72 of the lid 7. In this case, a single rib is formed on the support plate 72 side of the lid 7 (a similar rib to the rib 34 of the information medium 1) in place of the rib 135 described above. Also, although an example construction where a lid spring 8d is attached at only one end of the lid 7 has been described, it is also possible to use a construction where lid springs 8d are disposed at both ends of the lid 7. Also, although an example construction has been described where the arm portion 82 of the lid spring 8d is positioned at (i.e. fitted into) the gap 36 between the ribs 34 and 35, it is possible to use a construction where a groove is formed in the top plate 31 in place of the ribs 34 and 35 and the arm portion 82 is positioned in (i.e. fitted into) such groove. In addition, it is possible to use a construction that is not equipped with the ribs 34 and 35. Although an example has been described where the inclined surface 35a is formed on the rib 35, it is also possible to use a construction where inclined surfaces that are inclined toward the center of the gap 36 are formed on both the ribs 34 and 35.

Also, although an example of an information medium 1 that is used to back up data recorded by an electronic computer has been described, the present invention can also be applied to various types of information medium such as an information medium used to record image data or an information medium used to record audio data. Also, although the present invention has been described using the information medium 1 equipped with two tape reels 2 as an example, the present invention can also be applied to an information medium equipped with a single tape reel or an information medium equipped with a disc-shaped recording medium.

What is claimed is:

1. An information medium, comprising:
   a tape reel around which a magnetic tape is wound;
   a case body that rotatably encloses the tape reel;
   a lid comprising a support plate that is pivotally attached to the case body, the lid opening and closing a withdrawal opening configured to allow removal of the magnetic tape; and
   a coil spring positioned between the case body and the lid so that a first arm of the coil spring engages a top plate of the case body and a second arm of the coil spring engages the lid, the coil spring being configured to bias the lid in a direction of pivotal movement so as to close the withdrawal opening,
   wherein a pair of protruding portions are provided on the top plate; and
   the coil spring being provided so that the first arm extends linearly and an end of the first arm is configured to protrude from a withdrawal opening-side edge of the top plate, the first arm being positioned within a gap provided at a corner portion of the top plate, the gap being defined by a space provided between the pair of protruding portions.

2. An information medium comprising:
   a tape reel around which a magnetic tape is wound;
   a case body that rotatably encloses the tape reel;
   a lid comprising a support plate that is pivotally attached to the case body, the lid opening and closing a withdrawal opening configured to allow removal of the magnetic tape; and
   a coil spring positioned between the case body and the lid so that a first arm of the coil spring engages a top plate of the case body and a second arm of the coil spring engages the lid, the coil spring configured to bias the lid in a direction of pivotal movement so as to close the withdrawal opening,
   wherein a protruding portion is provided on the top plate; and
   the coil spring being provided so that the first arm extends linearly and an end of the first arm is configured to protrude from a withdrawal opening-side edge of the top plate, the first arm being provided at a corner portion of the top plate, the first arm being positioned between the protruding portion and the top plate,
   wherein an inclined surface is formed on the protruding portion, the inclined surface being inclined towards the first arm.

3. An information medium, comprising:
   a tape reel around which a magnetic tape is wound;
   a case body that rotatably encloses the tape reel;
   a lid comprising a support plate that is pivotally attached to the case body, the lid opening and closing a withdrawal opening configured to allow removal of the magnetic tape; and
   a coil spring positioned between the case body and the lid so that a first arm of the coil spring engages a top plate of the case body and a second arm of the coil spring engages the lid, the coil spring configured to bias the lid in a direction of pivotal movement so as to close the withdrawal opening, wherein
   the lid is attached to the case body so that the support plate is positioned further outside the case body than a side wall that forms a running path for the magnetic tape within the case body;
   a pair of protruding portions provided on the top plate and disposed in parallel between the support plate and the side wall;
   the coil spring being provided so that the first arm extends linearly and an end of the first arm is configured to protrude from a withdrawal opening-side edge of the top plate, the first arm being positioned within a gap provided at a corner portion of the top plate, the gap being defined by a space provided between the pair of protruding portions,
   wherein the second arm of the coil spring is configured to engage the support plate of the lid; and
   an inclined surface is provided on one of the pair of protruding portions which is positioned closer to the side wall.

* * * * *